A. CARY.
Steam Heater.

Patented June 4, 1867.

WITNESSES:
Theo. Fusche
J. A. Service

INVENTOR:
Alanson Cary
Per Munn & Co
Attorneys

A. CARY.
Steam Heater.

Patented June 4, 1867.

WITNESSES:
Theo Fuscke
J. Adunree

INVENTOR:
Alanson Cary
Per Munn & Co
Attorney

N. PETERS, PHOTO-LITHOGRAPHER, WASHINGTON, D. C.

United States Patent Office.

ALANSON CARY, OF NEW YORK, N. Y.

Letters Patent No. 65,345, dated June 4, 1867.

---

STEAM AND WATER-HEATING APPARATUS.

---

The Schedule referred to in these Letters Patent and making part of the same.

---

TO ALL WHOM IT MAY CONCERN:

Be it known that I, ALANSON CARY, of the city, county, and State of New York, have invented a new and improved Steam and Water-Heating Apparatus; and I do hereby declare that the following is a full, clear, and exact description thereof, which will enable others skilled in the art to make and use the same, reference being had to the accompanying drawings, forming part of this specification.

The object of this invention is to provide a safe, efficient, and economical apparatus for the warming of private dwelling-houses and public buildings of every description by heated air; and the invention consists in placing in a suitable apartment a succession of hollow plates, so constructed as to be steam and water-tight, which plates are connected together, and also connected with a steam boiler by suitable pipes; and also in an arrangement of tubes through the said plates, whereby I greatly increase the heating or radiating surface, as will be more fully described.

Figure 1, sheet 1, represents a plan or top view of my apparatus, enclosed in a chamber provided for the purpose, showing the connecting steam pipes and air tubes.

Figure 2, same sheet, represents a longitudinal section of fig. 1 through the line $x$ $x$, showing the interior of the hollow steam plates and air tubes, and also the connecting steam pipes.

Figure 3, sheet 2, represents a front or end view through the line $y$ $y$ of fig. 1, the wall of the chamber being removed.

Similar letters of reference indicate like parts.

The design of this arrangement of hollow steam plates and air tubes is to heat a current of air, which is allowed to pass into the chamber, and in contact with and through the plates, by the air tubes, and be discharged from the chamber and distributed through the building, as may be desired, in a heated state.

Figure 1:
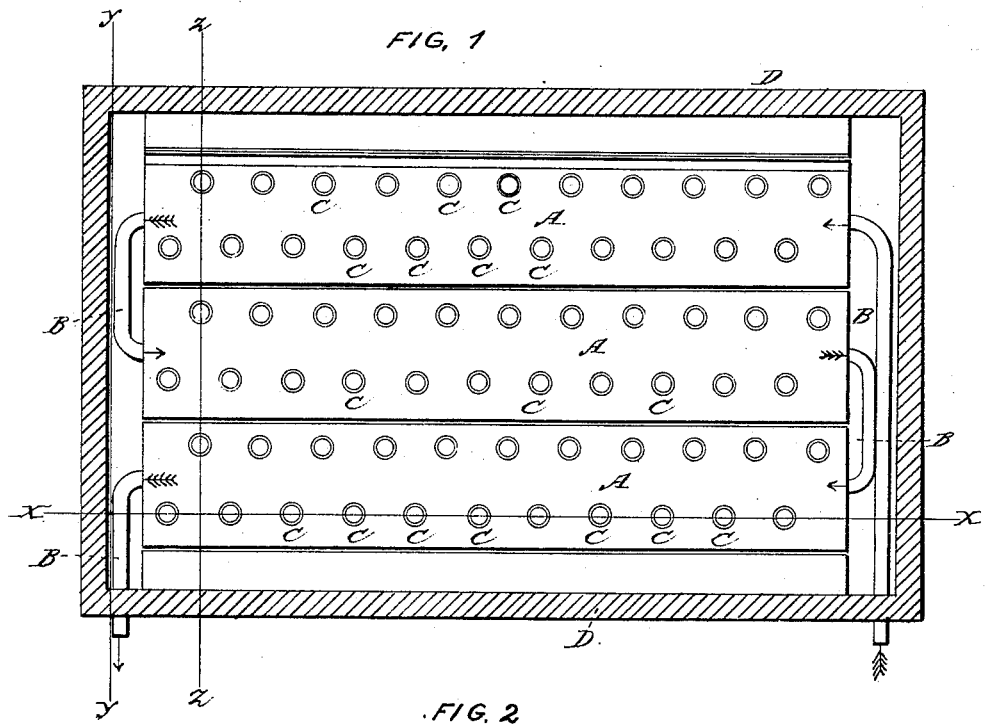
Figure 2:
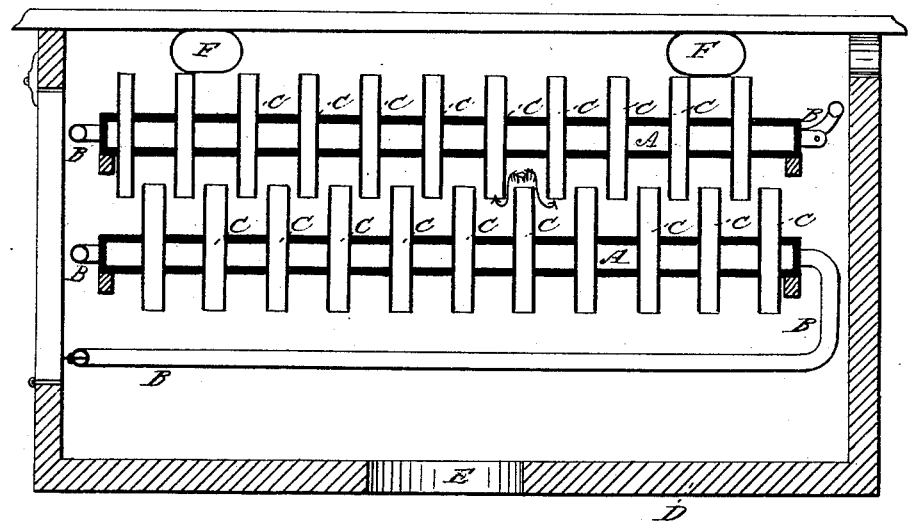
Figure 3:
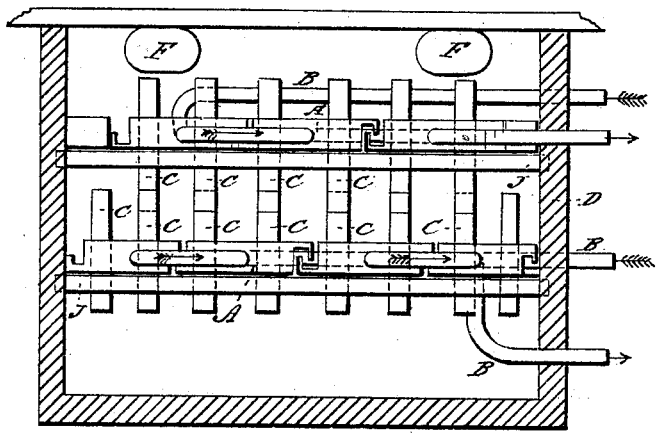
Figure 4:
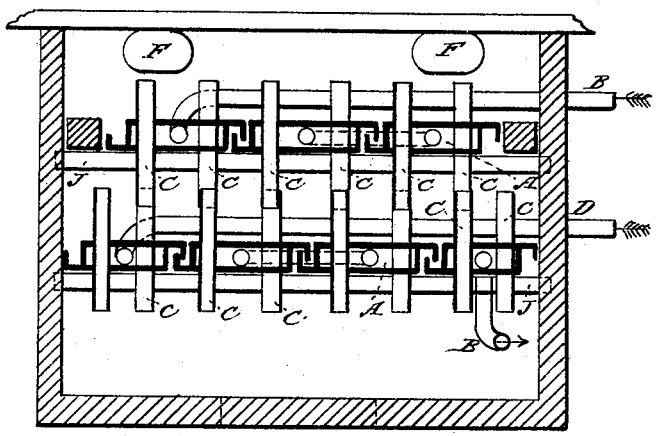
Figure 4 is a cross-section of fig. 1 through the line $z$ $z$.
Figure 5:
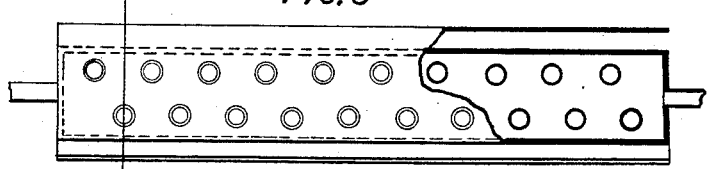
Figure 5 is a view of a detached hollow steam plate, with a portion broken away to show the interior.
Figure 6:
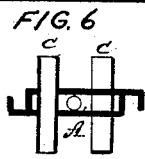
Figure 6 is a cross-section of the same through the line $r$ $r$.
Figure 7:
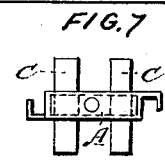
Figure 7 is an end view of the same.

A represents the hollow steam plate, a series of which is seen in fig. 1, connected together by the steam pipes marked B. C represents the air tubes, which pass through the steam plates, as seen in the drawing. D represents the walls of the chamber in which the steam plates are placed. E, fig. 2, is an aperture through the bottom of the chamber, for the admission of cold air. F, fig. 2, represents apertures for the discharge of the heated air. The steam from the boiler enters at one end of one of the steam plates, and passes out at the other end, and into the next plate in the series, and from that to the next, as indicated by the arrows in fig. 1. Two or more series of these plates may be placed in a chamber, as seen in fig. 2. But as there is no steam connection between them, a single series, or any number contained in the chamber, may be used. Any one or more of the series of plates may be disconnected from the boiler at any time by simply turning a steam-cock. By this arrangement I am enabled to adjust the apparatus to suit the different seasons of the year, or the temperature required in the building. The hot-air tubes C are simply short tubes, which pass directly through the plates, as seen in fig. 2. As the cold air enters at E, the lower portion of the chamber becomes filled, which, by its upward tendency, strikes the lower side of the first series of plates. Currents of air are at the same time passing upward through each of the air tubes. These currents strike or impinge against the bottom side of the next series of plates, becoming thereby expanded, and pass up through the tubes in that series into the upper portion of the chamber, from whence the air is distributed to the different parts of the building. It will be noticed that where the plates join to form the series there is a passage for the air, as will be distinctly seen in fig. 4. Each series of plates rests on suitable supporting-bars, which are marked J in the drawing, so that the joint between the plates may be left sufficiently loose for the passage of a current of air. This peculiar formation of the edges of the plates, as seen in the cross-sections, figs. 6 and 7, furnishes, in combination with each other, and taken altogether, a large additional heating surface. It is well known that air is a very bad conductor of heat, and that to become heated sufficiently for warming purposes, each particle must be brought in contact with a heated metallic or other surface. Consequently it is of great importance that any apparatus for heating air by steam or water should present the largest and most extended heating surface in the smallest space. Otherwise the expense of an apparatus for heating buildings by this method would be greatly enhanced. By passing the air tubes C through the hollow steam plates, the heating surface is not only greatly increased, but the course the air is obliged to travel in its passage from the bottom to the top of the chamber adds materially to the amount of caloric which it absorbs. The ends of the tubes are conductors of heat from the steam in the plates, besides which the air is brought directly in contact with the sides of the heated plates, from which, being greatly expanded, it recoils and is forced to pass through the tubes. But another and very important advantage is gained by passing the tubes through the plates according to my plan. It is not uncommon to use steam of twenty or forty pounds' pressure to the square inch in an apparatus of this kind, and where hollow steam plates are used, it requires particular care to strengthen them sufficiently to render them safe under that pressure. In my apparatus the air tubes serve to bind the plates together past all danger from that source. It will be noticed that the plates (or series of plates) are inclined sufficiently to allow the water of condensation to pass off and out of the chamber, and back into the boiler.

Having thus described my invention, what I claim as new, and desire to secure by Letters Patent, is—

The combination and arrangement, within the case D, of one or more series of inclined steam cases A, united together at their edges by means of the angular plates, and connected by the steam pipes B, each plate provided with air tubes C passing through them, the tubes in the lower series not being in the same vertical plane with the tubes in the upper series of cases, substantially as described for the purpose specified.

ALANSON CARY.

Witnesses:
WM. F. McNAMARA,
ALEX. F. ROBERTS.